J. S. JOLINE & E. H. WHEELER.
HEDGE TRIMMER.
APPLICATION FILED MAY 6, 1911.
1,014,480.
Patented Jan. 9, 1912.
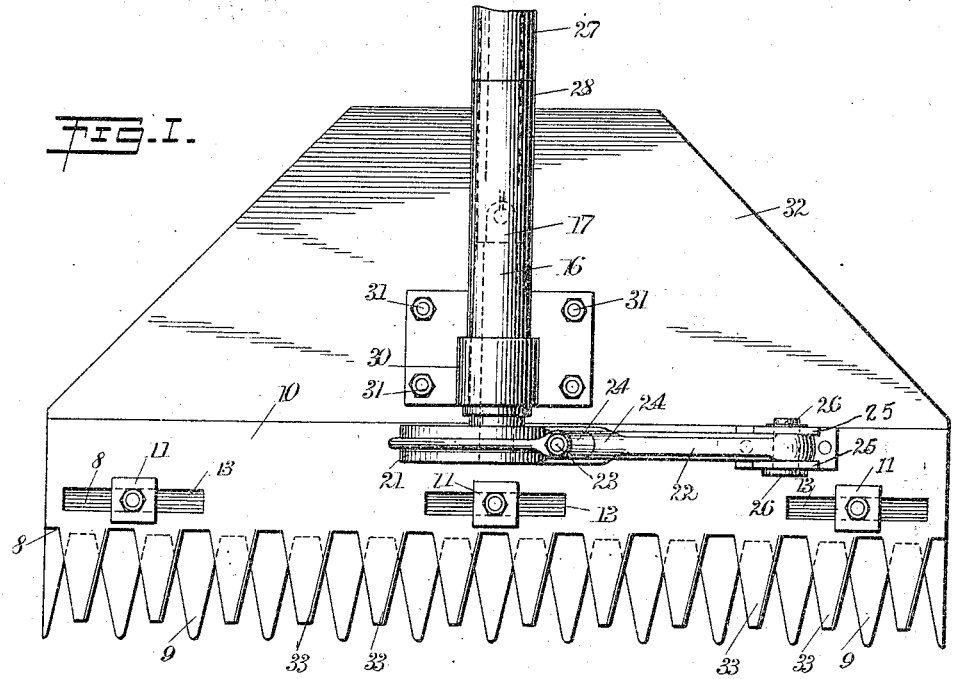
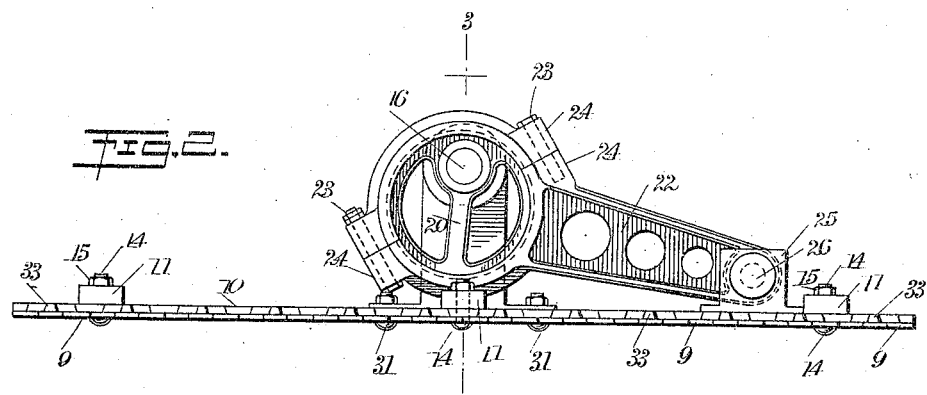
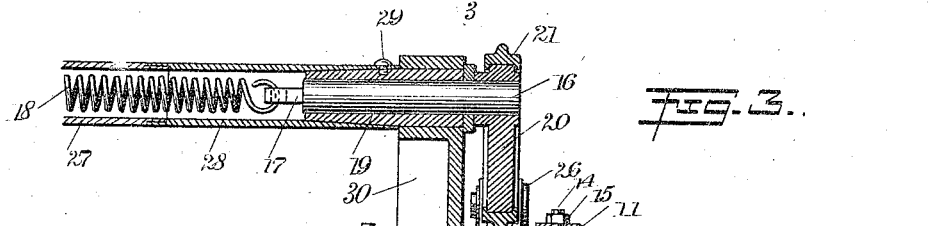
WITNESSES
G. Robert Thomas
E. Murdock
INVENTOR
James S. Joline
Edwin H. Wheeler
BY Munn & Co.
ATTORNEYS

UNITED STATES PATENT OFFICE.

JAMES S. JOLINE AND EDWIN H. WHEELER, OF LONG BRANCH, NEW JERSEY.

HEDGE-TRIMMER.

1,014,480. Specification of Letters Patent. Patented Jan. 9, 1912.

Application filed May 6, 1911. Serial No. 625,570.

*To all whom it may concern:*

Be it known that we, JAMES S. JOLINE and EDWIN H. WHEELER, citizens of the United States, and residents of Long Branch, in the county of Monmouth and State of New Jersey, have invented a new and Improved Hedge-Trimmer, of which the following is a full, clear, and exact description.

The principal object which the present invention has in view is to furnish a guide member for a hedge trimmer to enable the operator to maintain constant the path of operation.

With this object in view the invention consists in providing an elongated plate or rear extension member alined with the cutters to guide the said trimmer.

One embodiment of the present invention is disclosed in the structure illustrated in the accompanying drawings, in which like characters of reference denote corresponding parts in all the views, and in which—

Figure 1 is a top plan view of a trimmer constructed and arranged in accordance with the present invention; Fig. 2 is a front elevation of a trimmer constructed and arranged in accordance with the present invention; and Fig. 3 is a longitudinal vertical section taken on the line 3—3 in Fig. 2.

As shown in the accompanying drawings, the trimmer is provided with a relatively stationary finger bar 8 which is provided with separating fingers 9 extended at suitable intervals across the forward or front end of the bar 8. Reciprocatively mounted upon the bar 8 is a cutter bar 10. The bar 10 is guided in its reciprocation by blocks 11. The blocks 11, as shown in Fig. 3 of the drawings, are provided with extensions 12 in the under face thereof which rest upon the finger bar 8 and within the guide slots 13 formed in the cutter bar 10. The blocks 11 are held firmly in position by bolts 14 and screw nuts 15. Sufficient clearance is given to the blocks 11 to permit the free reciprocation of the cutter bar 10. It will be understood that by diminishing the depth of the extensions 12 the cutter bar 10 may be drawn more closely to the finger bar 8, thereby taking up any wear incident to the operation of the apparatus.

The cutter bar is reciprocated by a short shaft 16, which shaft is at the rear end provided with an eyeleted extension to receive the end of a flexible transmission shaft 18. The shaft 16 is suitably provided with a bushing 19, the rearward portion of which is slightly tapered, as best seen in Fig. 3.

Fixedly attached to the shaft 16 is an eccentric wheel 20. The wheel 20 is suitably mounted in an eccentric ring 21 formed at the end of a connecting bar 22. The ring 21 is, as shown in Fig. 2 of the drawings, constructed in two half sections, one of said sections being formed integrally with the bar 22 and the other section being formed as an independent or removable section. The two sections are united, being held together by means of bolts 23, which bolts are extended through perforations provided in the bolting flanges 24. The free end of the bar 22 is pivotally mounted between the plates 25, being there held by a pivot pin 26.

The motive power for driving the shaft 16 and the cutter bar 10 may be furnished by any suitable motor, hand or power driven. The transmission from the driving shaft of the motor to the shaft 16 is by means of the shaft 18. The shaft 18 is provided with a flexible covering 27 which is suitably mounted in the end of a connecting tube 28. The tube 28 is, at the forward end, internally tapered to slip upon the tapered extension of the bushing 19. The tube 28 is held on the bushing 19 by means of a screw 29, or other suitable device. The tube 28 forms a hand hold for the guidance and support of the machine.

The bushing 19 is suitably mounted in a perforation formed in the upper end of a standard 30. The standard 30 is rigidly secured by means of bolts 31 upon a guide-board 32. The guide-board 32, as shown in Fig. 3 of the drawings, is constructed integrally with the finger bar 8, and is extended in a straight plane with the fingers 9 formed thereon. As the cutting is accomplished by the blades 33 and the fingers 9, the extension of the guide-board 32 is parallel to the line of cut. The board 32, as shown in Fig. 1, is extended well back under the hand-hold formed by the tube 28 and prevents the rocking of the trimmer on its transverse axis. Thus it will be seen that when making a straight cut so much desired in trimming hedges the board 32 provides a perfect guide for the movement of the trimmer along the side of the said hedge.

Having thus described our invention, what we claim as new and desire to secure by Letters Patent is:—

1. In a hedge trimmer, a flat surfaced guide board having formed at the forward edge thereof a series of forwardly extended separated cutting blades; a flat cutter bar slidably mounted on said plate adjacent the forward edge thereof, said bar being provided with a series of cutter blades to operate in conjunction with the cutter blades of said plate; a driving shaft suitably mounted on said plates; an eccentric disk mounted an said shaft; a pitman rod connecting said cutter bar and said disk said rod being provided with a collar to fit said disk; and a flexible transmission shaft for rotating said driving shaft and operatively connected with a prime mover removed from said trimmer.

2. In a hedge trimmer, a flat surfaced guide board having formed at the forward edge thereof a series of forwardly extended separated cutting blades; a flat cutter bar slidably mounted on said plate adjacent the forward edge thereof, said bar being provided with a series of cutter blades to operate in conjunction with the cutter blades of said plate; a driving shaft suitably mounted on said plate; an eccentric disk mounted on said shaft; a pitman rod connecting said cutter bar and said disk said rod being provided with a collar to fit said disk; a flexible transmission shaft for rotating said driving shaft and operatively connected with a prime mover removed from said trimmer; and a tubular hand hold for said trimmer adapted to receive in protected relation the end of said flexible shaft.

In testimony whereof we have signed our names to this specification in the presence of two subscribing witnesses.

JAMES S. JOLINE.
EDWIN H. WHEELER.

Witnesses:
FLORENCE A. JOLINE,
H. JOLINE.